United States Patent
Chu et al.

(10) Patent No.: US 9,098,331 B2
(45) Date of Patent: Aug. 4, 2015

(54) JOINT SCHEDULING OF MULTIPLE PROCESSES ON A SHARED PROCESSOR

(75) Inventors: Chung Cheung Chu, Brossard (CA); Rafi Rabipour, Cote St. Luc (CA); Djordje Konforti, Montreal (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 328 days.

(21) Appl. No.: 13/171,848

(22) Filed: Jun. 29, 2011

(65) Prior Publication Data

US 2013/0007754 A1    Jan. 3, 2013

(51) Int. Cl.
*G06F 9/46* (2006.01)
*G06F 9/48* (2006.01)
*H04L 12/70* (2013.01)

(52) U.S. Cl.
CPC .............. *G06F 9/4887* (2013.01); *H04L 47/00* (2013.01)

(58) Field of Classification Search
None
See application file for complete search history.

(56) References Cited

U.S. PATENT DOCUMENTS

| | | | |
|---|---|---|---|
| 5,944,778 A * | 8/1999 | Takeuchi et al. | 718/100 |
| 6,112,221 A * | 8/2000 | Bender et al. | 718/102 |
| 6,393,433 B1 * | 5/2002 | Kalavade et al. | 1/1 |
| 6,567,840 B1 * | 5/2003 | Binns et al. | 718/103 |
| 7,386,586 B1 * | 6/2008 | Headley et al. | 709/202 |
| 7,444,638 B1 * | 10/2008 | Xu | 718/104 |
| 7,586,892 B2 * | 9/2009 | Patt-Shamir et al. | 370/346 |
| 7,733,895 B2 | 6/2010 | Kesselman et al. | |
| 8,149,698 B1 | 4/2012 | Chu et al. | |
| 2005/0081200 A1 * | 4/2005 | Rutten et al. | 718/100 |
| 2006/0026052 A1 * | 2/2006 | Klett et al. | 705/8 |
| 2008/0155550 A1 * | 6/2008 | Tsafrir et al. | 718/103 |
| 2009/0046698 A1 | 2/2009 | Chu et al. | |
| 2009/0282413 A1 * | 11/2009 | Cialini et al. | 718/102 |
| 2010/0115526 A1 * | 5/2010 | Mincarelli | 718/104 |
| 2010/0191349 A1 * | 7/2010 | Munaga | 700/33 |
| 2010/0262969 A1 * | 10/2010 | Dijkstra et al. | 718/104 |
| 2011/0107341 A1 * | 5/2011 | Longobardi et al. | 718/102 |
| 2011/0161964 A1 * | 6/2011 | Piazza et al. | 718/102 |
| 2011/0209152 A1 * | 8/2011 | Camps Mur et al. | 718/102 |
| 2012/0198462 A1 * | 8/2012 | Cham et al. | 718/103 |

OTHER PUBLICATIONS

Xu, J., et al., "Priority Scheduling Versus Pre-Run-Time Scheduling", The International Journal of Time-Critical Computing Systems, Real Time Systems, Kluwer Academic Publishers, vol. 18, No. 1, pp. 7-23, Jan. 1, 2000 Dordrecht, Netherlands, XP-002371818.
Ramamritham, K., et al., "Scheduling Algorithms and Operating Systems Support for Real-Time Systems", 8078 Proceedings of the IEEE, vol. 82, No. 1, pp. 55-67, Jan. 1, 1994, New York, USA, XP000435881.
Deng, Z., et al., "A Scheme for Scheduling Hard Real-Time Applications in Open System Environment", Ninth Euromicro Workshop on Real-Time Systems, IEEE Comput. Soc., pp. 191-199, Jun. 11-13, 1997, Toledo, Spain, XP010240880.
Abeni, L., et al., "Integrating Multimedia Applications in Hard Real-Time Systems", Real-Time Systems Symposium, Proceedings, the 19th IEEE, pp. 4-13, Dec. 2-4, 1998, Madrid, Spain, XP010318750.

\* cited by examiner

*Primary Examiner* — Charles Swift
(74) *Attorney, Agent, or Firm* — Coats and Bennett, PLLC

(57) ABSTRACT

A multi-process scheduler applies a joint optimization criterion to jointly schedule multiple processes executed on a shared processor. The scheduler determines, for each one of a plurality of processes having a predetermined processing time, at least one of an expected arrival time for input data and required delivery time for output data. The scheduler jointly determines process activation times for the processes based on said arrival/delivery, and the processing times, to meet a predetermined joint optimization criterion for the processes. The processes are scheduled on the shared processor according to the jointly determined activation times to minimize queuing delay.

28 Claims, 5 Drawing Sheets

JOINT SCHEDULING OF MULTIPLE PROCESSES ON A SHARED PROCESSOR

BACKGROUND

The present invention relates generally to scheduling of processing resources and, more particularly, to methods and apparatus for joint scheduling of multiple processes on a shared processor.

A typical communication network includes media gateways for processing of media streams representing voice, audio, and/or video. The media gateway is responsible for timely processing and delivery of the media stream to ensure a desired quality of service (QoS). One of the factors governing QoS in a communication network is end-to-end delay, i.e. how long it takes to deliver packets from the source to the destination. In general, it is desirable to keep the end-to-end delay as low as possible.

The end-to-end delay comprises several components, including algorithmic delay, processing delay, and queuing delay at the media gateway. Algorithmic delay and processing delay are a function of the particular coding algorithms and the processing platforms, which are typically fixed. By contrast, queuing delay depends on the time when data for a given communication channel is scheduled for processing, allowing a measure of control.

Control of queuing delay for a processor handling a single channel is relatively simple, as the schedule for the processing of the data has to be aligned to either the arrival phase of incoming data, or to a desired transmission phase. Some complication arises owing to the fact that interactive communication channels require independent (and concurrent) processing in two directions, giving rise to potential conflict between the requirements of the two transmission directions. The magnitude of the problem increases sharply when a processor is shared among many channels, as the likelihood of conflict in scheduling requirements increases with the number of channels sharing the same processor. The resolution of the problem requires a scheduling mechanism that can provide a practical trade-off in handling of the conflicting requirements of the two processing directions for many channels served by the processor, while ensuring that the calculation of the schedule itself can be done with a reasonable amount of processing for minimal overhead.

Scheduling algorithms for scheduling multiple processes on a shared processor are known. A process is a task which is characterized by reception of an input stream, input processing/output generation, and delivery of an output stream. An example of such a process is an ingress (or egress) call processing thread where data is received at one call context termination and processed according to the desired operation. Newly generated output data is delivered out of the opposite termination to the peer communication node.

When a single processing engine is tasked with handling multiple processes, the scheduler needs to ensure appropriate allocation of processing resources to each process. Two scheduling approaches are commonly used in the industry. The first approach, referred to herein as the static approach, assumes static scheduling with a fixed activation schedule for a fixed number of processes with a fixed amount of processing resources required by each process. The second approach, referred to herein as the on-demand approach, uses input packet arrival as a trigger for process scheduling In the first approach, the scheduling mechanism makes available a predefined amount of resources to each one of a predefined number of processes. Processing resources are allocated to the processes according to a predetermined pattern, typically in a round-robin manner. For example, consider a digital signal processing (DSP) engine of a media gateway that is designed to support a maximum of two call contexts. Assuming the maximum processing resource required by each downlink (ingress) and uplink (egress) processes is 5 ms each, the scheduler invokes context-0 uplink, context-0 downlink, context-1 uplink, context-1 downlink at time instants 0 ms, 5 ms, 10 ms, and 15 ms, respectively, within each 20 ms processing period.

In the second approach, processing resources are allocated on-demand when input packets are received. For example, a bearer-relay task for a call context is activated whenever an input packet is received from an IP network. In another example, a low-bit-rate encoding task for a call context is invoked when the Pulse Code Modulation (PCM) input buffer is filled with samples received from the Public Switched Telephone Network (PSTN) network.

There are several drawbacks associated with the aforementioned scheduling mechanisms. One drawback of the static scheduling approach is in queuing delay performance, which is measured as the time difference between the actual and the desired activation times. The static design assigns an activation time to each new process without taking into account the optimal activation requirement of the process. In statistical terms, the queuing delay would have a random value, typically with a uniform distribution with respect to the desired activation times. Optimal queuing delay is not necessarily provided even when there is only one active process in the shared processing engine. In addition, the static scheduling approach is not well suited for scenarios where the configuration and processing requirements are not homogeneous. In absence of intelligent and dynamic scheduling update, queuing delay is typically higher for the static scheduling approach than it needs to be.

The on-demand approach is by nature for individual processing activation with little regard to inter-process scheduling impact. This scheduling approach is sensitive to jitter in individual activation conditions, individual resource requirement variations, and number of processes to support. In a real time multi-processing system, such as a media gateway implementation, this scheduling approach typically results in unpredictable (and often undesirable) jitter in packet output delivery.

SUMMARY

The present invention provides a dynamic multi-process scheduler that reduces the worst-case queuing delay or mean queuing delay encountered by processes served by a shared processor. More particularly, a multi-process scheduler according to some exemplary embodiments applies a joint optimization criterion to jointly schedule multiple processes executed on a shared processor. The joint scheduling approach mitigates shortcomings associated with the conventional approaches listed above to improve queuing delay performance. It is also adaptive to different capacity requirements. The joint scheduling approach also lends itself to versatile and flexible designs whose implementation can be tailored to meet various implementation constraints and design objectives. It has a small footprint that makes it particularly suitable for Digital Signal Processor (DSP) implementation for real time high-capacity applications.

Exemplary embodiments of the invention comprise methods of jointly scheduling multiple processes on a shared processor. In one exemplary method a scheduler determines, for each one of a plurality of processes having a predetermined processing time, an expected arrival time for input data or required delivery time for output data. The scheduler jointly determines process activation times for the processes based on said arrival times or delivery times and the processing times, to meet a predetermined joint optimization criterion for the processes. The processes are scheduled on the shared processor according to the jointly determined activation times.

Other embodiments of the invention comprise a processing circuit. The processing circuit comprises a shared processor to perform multiple processes, each process having a predetermined processing time, and a scheduler for jointly scheduling the processes on the shared processor. The scheduler is configured to determine, for each one of a plurality of processes having a predetermined processing time, an expected arrival time for input data or required delivery time for output data. The scheduler jointly determines process activation times for the processes based on said arrival times or delivery times and the processing times, to meet a predetermined joint optimization criterion for the processes. The processes are scheduled on the shared processor according to the jointly determined activation times.

DETAILED DESCRIPTION

Figure 1:
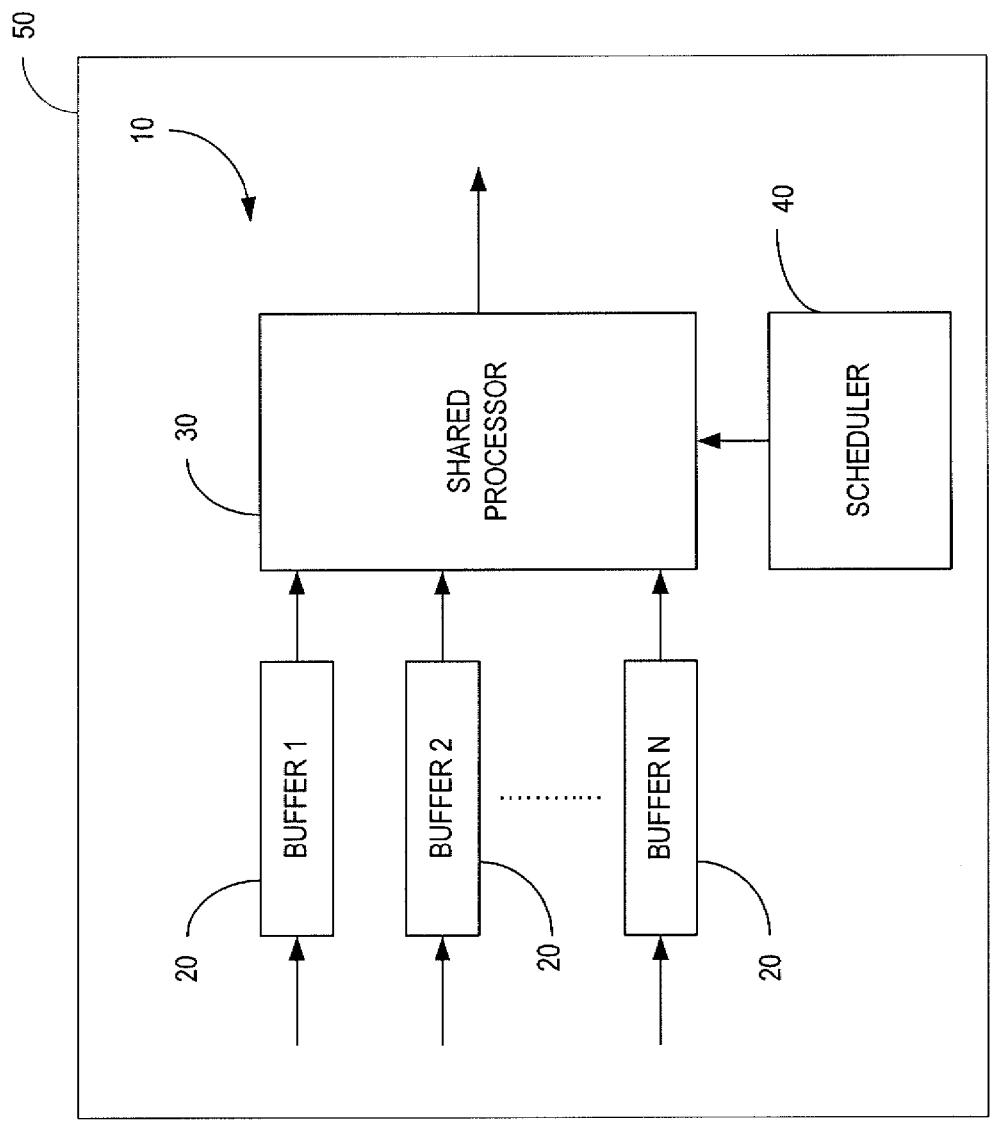
FIG. 1 illustrates an exemplary processing circuit according to one embodiment.

With reference to the drawings, FIG. 1 illustrates an exemplary processing circuit 10 according to one embodiment of the present invention. The processing circuit 10 may, for example, reside in a media gateway 50 or other network node in a mobile communication network, wherein the processing circuit 10 is configured to process media streams transmitted to or from a mobile terminal (not shown). Exemplary processing tasks performed by the processing circuit 10 include encoding, decoding and transcoding media streams being transmitted to or from a mobile terminal. One exemplary processing circuit 10 is configured for use in a Universal Mobile Telecommunications Service (UMTS) network. The UMTS network may implement Wideband Code Division Multiple Access (WCDMA) and/or Long-Term Evolution (LTE) standards. Those skilled in the art will appreciate that the exemplary embodiment is for illustrative purposes and that the present invention is more generally applicable to packet data networks, including without limitation wireless networks such as Code division Multiple Access (CDMA) networks, General Packet Radio Service (GPRS) networks, and Enhanced GPRS (E-GPRS) networks, also known as EDGE networks.

The processing circuit 10 comprises a series of input buffers 20 corresponding to respective media streams, a shared processor 30 for processing the media streams, and a joint scheduler 40, for scheduling processes on the shared processes 30. As used herein, the term "process" refers to any digital signal processing task for transforming an input stream to generate an output stream. For example, a process may comprise encoding a media stream to generate a coded output stream, decoding a media stream to generate a decoded output stream, or transcoding a media stream to convert a coded media stream from one coding format to another. In the exemplary embodiments herein described, the processes are periodic processes which are executed periodically by the shared processor. The term "shared processor" refers to any processing circuit (which may include multiple microprocessors) whose resources are being shared.

In FIG. 1, input data streams are fed to respective buffers 20, where the input data is held until it can be processed. The shared processor 30 processes the input data streams to generate output data streams. The joint scheduler 40 schedules the processing of the input data streams so as to minimize or reduce a queuing delay. For example, in some embodiments, the joint scheduler 40 may determine process activation times or phases for each process so as to minimize or reduce a worst-case delay for the processes. In other embodiments, the joint scheduler 40 may schedule activation of the processes in order to minimize or reduce a mean delay of all of the processes. The joint scheduling is based on knowledge of the input data arrival times and/or output data delivery times, and the processing times, for each of the processes. The joint scheduler 40 considers the arrival/delivery times and processing times to determine an optimal process activation schedule for all of the processes.

The joint scheduling approach as described herein has two main variants: input-phase-aligned scheduling and output-phase-aligned scheduling. These approaches may be employed separately or together. For input-phase-aligned scheduling, the process activation times are functions of the input packet arrival times and the processing times for the processes served by the shared processor. For example, in a media gateway 50 supporting CDMA A2p-YY call contexts, the desired process activation times are the times at which the input packets are available after input jitter buffering. For output-phase-aligned scheduling, the desired process activation times are functions of the output delivery times and the processing times for the processes performed on the shared processor. For example, in a media gateway supporting multiple UMTS Public Switched Telephone Network Iu (PSTN-Iu) call contexts, the desired process activation times are the times where, after processing, the output packets are guaranteed to be available for delivery at a prescribed target time specified through a "time alignment" message received via the Iu protocol layer. A scheduling approach to support time alignment is described more fully in U.S. Pat. Nos. 7,817,678, and 11/651,427 filed Jan. 9, 2007, which are incorporated herein in their entirety by reference.

These two variants can be applied individually or together according to the desired phase alignment requirement of each active process in the shared processing engine. For example, input-phase-aligned scheduling may be applied to a first set of processes, while output-phase-aligned scheduling may be applied to a second set of processes. An output-phase-aligned process is a process that must output data by a target delivery time. Input-phase-aligned processes are processes that should be activated based on input packet arrival phase.

When both input-phase and output-phase-aligned scheduling is used, the optimal input-phase-aligned schedule and optimal output-phase-aligned schedule are individually derived and then merged together into one final schedule.

Contention resolution is handled during the merging stage. Implementation-dependent arbitration can be defined for contention resolution.

Joint scheduling of two or more tasks as described herein can also be applied together with conventional scheduling designs. Assuming that a particular implementation must invoke certain processes at a predefined set of discrete time instants, the remaining processes can still be scheduled according to the desired phase alignment requirement. The final activation schedule may be sub-optimal due to trade-offs imposed by added constraints, but it would still be likely to have improved queuing delay performance.

In some embodiments, a set of two or more processing queues with different processing priority assignments are defined. For example, separate queues may be established for low priority and high priority processes. Different scheduling techniques may be applied to different processing queues. For the high priority queue, the scheduler 40 may determine the process activation times that minimize the worst-case delay or mean queuing delay for processes posted to the high priority queue. For the low priority queue, a conventional on-demand or best effort scheduling approach may be used where processes are posted in the order in which they are received. The processes assigned to the respective queues are serviced according to the pre-defined order of priority. As one example, the following rules may be applied to processing queues with different priority:

- Within lower priority queues, processing tasks are executed in the order in which they were posted only if there are no higher priority tasks pending.
- Delay between posting and execution of a task in lower priority queues is not guaranteed.
- Within the high priority queue, processing tasks are executed in the order in which they were posted.
- Delay between posting and execution of a task in the high priority queue is guaranteed to be no more than the duration of the worst-case lower priority task execution.

Delay optimization as herein described can be triggered by a request or other event, or may be performed periodically. For example, delay optimization can be triggered by a time alignment (TA) request, or by a dejitter buffer fine tuning (DJBFT) request. A time alignment request specifies a delivery target for data output by a process. A DJBFT request specifies times at which the input packets are available after dejitter buffer treatment. When delay optimization is triggered, the joint scheduler updates the entire process schedule to assign a new set of activation times and processing durations to all active processes. The joint scheduler may, for example, use the minimax algorithm or other known optimization algorithm for determining the delay optimized schedule.

Figure 2:
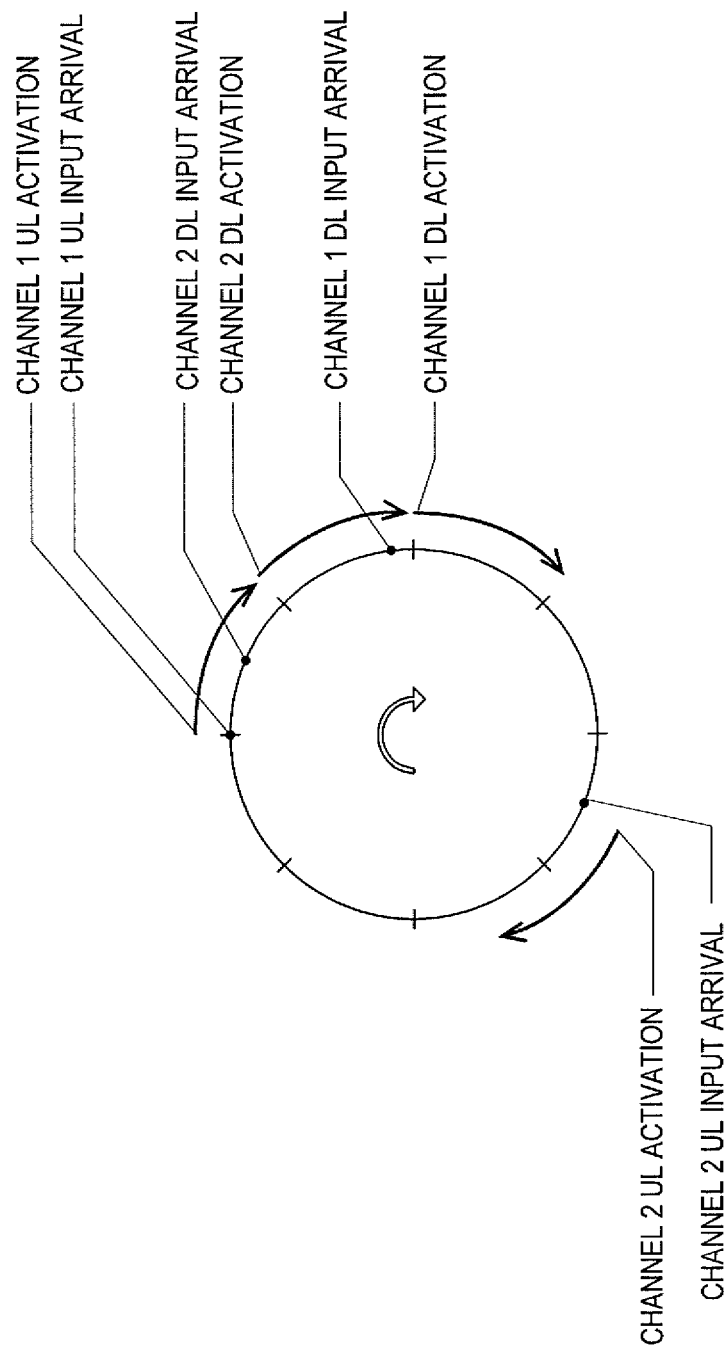
FIG. 2 illustrates on example of joint scheduling according to the present invention based on input packet arrival times of data packets for multiple processes.

FIG. 2 illustrates one example of input-phase-aligned scheduling for supporting two CDMA mobile call contexts. Input-phase-aligned scheduling is applied to both downlink (DL) and uplink (UL) call context tasks. All four processing tasks are invoked according to a single globally optimized schedule. For this example, each processing task is assumed to require a maximum of 2.5 milliseconds of processing time, i.e., the processing delay. FIG. 2 shows the 20 ms processing time cycle and the input data arrival time for each of the four processes and the optimal processing schedule. FIG. 2 and Table 1 below show the optimal schedule

TABLE 1

Input-phase-aligned Scheduling

| Process | Arrival Times (ms) | Process Activation Times (ms) |
|---|---|---|
| Channel 1 Uplink | 0 | 0 |
| Channel 2 Uplink | 10-12.5 | Arrival Time |
| Channel 1 Downlink | 2.5-5.0 | 5.0 |
| Channel 2 Downlink | 0-2.5 | 2.5 |

Figure 3:
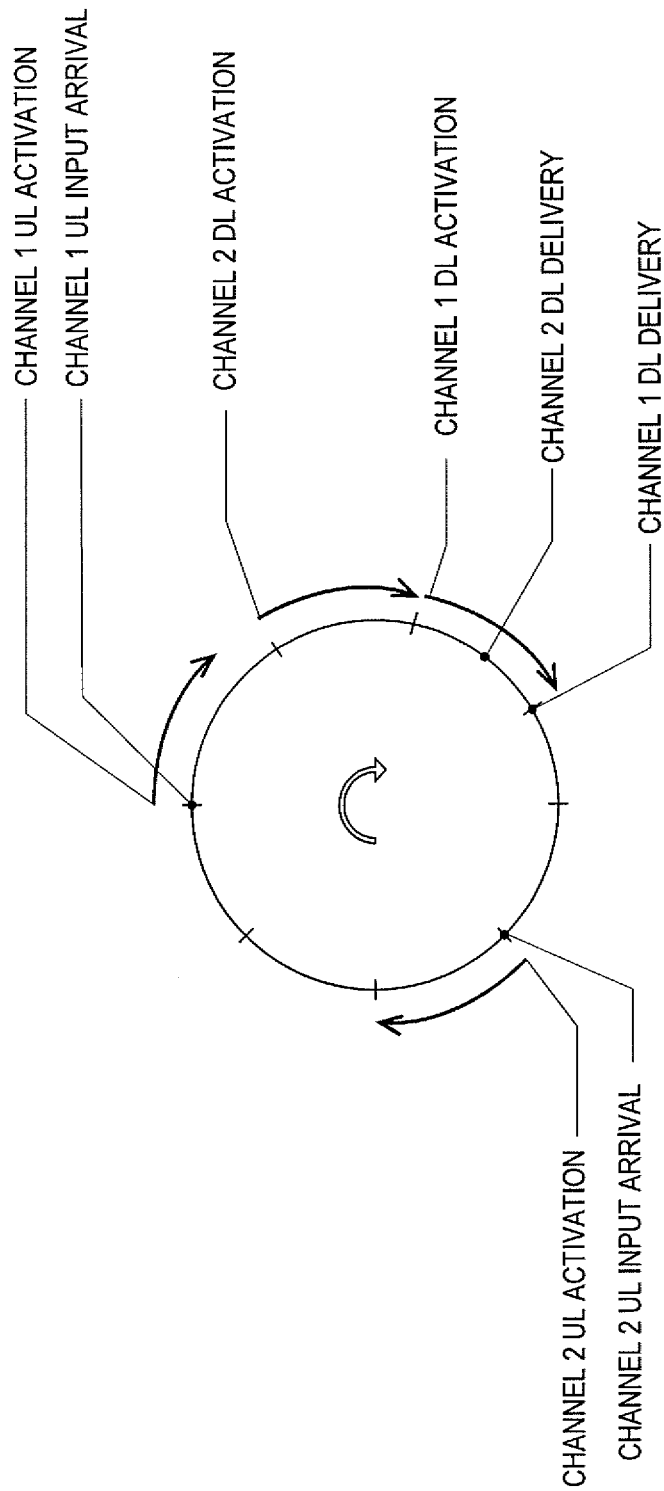
FIG. 3 illustrates on example of joint scheduling according to the present invention based on output packet delivery times of data packets for multiple processes.

FIG. 3 illustrates an example of output-phase-aligned scheduling for supporting multiple UMTS PSTN-Iu call contexts. This example shows how the joint scheduling techniques described herein can be applied together with conventional scheduling techniques. In this example, the two downlink call context task activations are based on output-phase-aligned scheduling as specified by time-alignment requests from the respective RNCs, and the two uplink tasks are subject to the conventional on-demand approach. For illustration purpose, each task is presumed to require a maximum 2.5 ms processing time. FIG. 3 shows the 20 ms processing time cycle and the desired delivery times for the two downlink tasks. These represent the latest downlink processing completion instants. FIG. 3 and Table 2 below show the optimal output-phase-aligned activation schedule for the downlink tasks.

TABLE 2

Output-phase-aligned Scheduling

| Process | Arrival Times (ms) | Delivery times (ms) | Process Activation Times (ms) |
|---|---|---|---|
| Channel 1 Uplink | 0 | — | 0 |
| Channel 2 Uplink | 10-12.5 | — | Arrival Time |
| Channel 1 Downlink | — | 7.5-10.0 | 5.0-7.5 |
| Channel 2 Downlink | — | 5—channel 1 delivery time | 2.5-5.0 |

Figure 4:
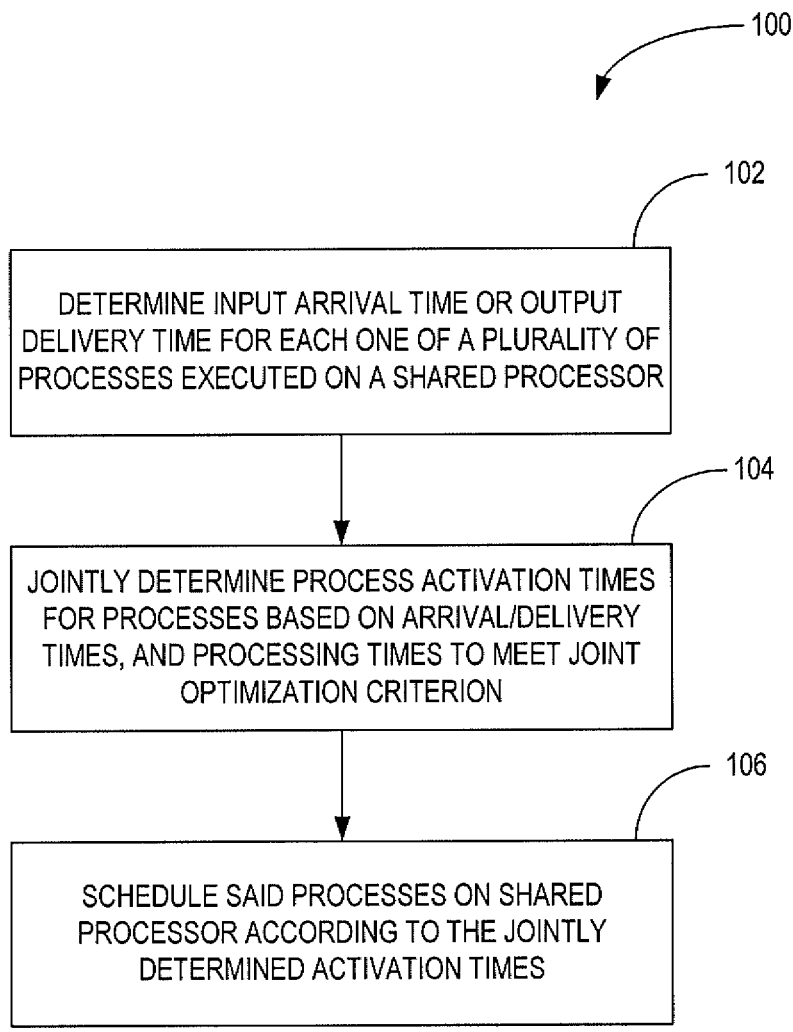
FIG. 4 illustrates an exemplary joint scheduling method according to a first embodiment.

FIG. 4 illustrates an exemplary joint scheduling method 100 according to one embodiment. Knowledge a priori of the processing times for each of the processing tasks is presumed. The scheduler 40 may be configured to account for the variance in the processing time from one processing cycle to the next. The scheduler 40 determines the input arrival time or output data delivery time for each one of a plurality of processes executed on a shared processor 30 (block 102). The input data arrival time comprises the packet arrival time after de-jitter treatment. The output data delivery times may, for example, be specified by time alignment requests by the RNC as previously described. The scheduler 40 jointly determines process activation times for each process based on the input data arrival/output data delivery time for each processing task, and the corresponding processing times, so as to meet a predetermined joint optimization criterion (block 104). For example, the scheduler 40 may minimize a worst-case delay for the jointly scheduled processes. Alternatively, the scheduler may minimize a mean queuing delay for the jointly scheduled processes. The scheduler then schedules the processes on the shared processor according to the jointly determined activation times (block 106).

The input-phase-aligned and output-phase-aligned scheduling techniques can also be applied to different processes being scheduled on the same processor. For example, in a media gateway to support mobile call contexts, all downlink tasks can be scheduled using the output-phase-aligned scheduling technique where the packet delivery times are specified by the RNC through time alignment request (3GPP TS 25.415). Concurrently, all uplink call context tasks can be scheduled using the input-phase-aligned scheduling technique where the input data arrival times are determined after dejitter buffer treatment. Delay optimization is performed separately for the output-phase-aligned processes and input-phase-aligned processes. The individually derived input-phase-aligned and output-phase-aligned schedules are then merged together into one final schedule. Contention resolution is handled during the merging stage.

In one exemplary embodiment, the joint scheduler 40 uses the minimax algorithm for output-phase-aligned processes. The activation time of a processing task is advanced in the event of schedule contention with other processing tasks. The input-phase-aligned processes cannot be scheduled in a manner completely identical to output-phase-aligned processes. In the event of schedule contention, an input-phase-aligned process subject to a DJBFT request cannot have its activation time advanced. Otherwise the process risks premature activation with no input available in the dejitter buffer. Therefore, a separate optimization algorithm is applied to input-phase aligned processes where the segments are delayed in the event of schedule contention.

Figure 5:
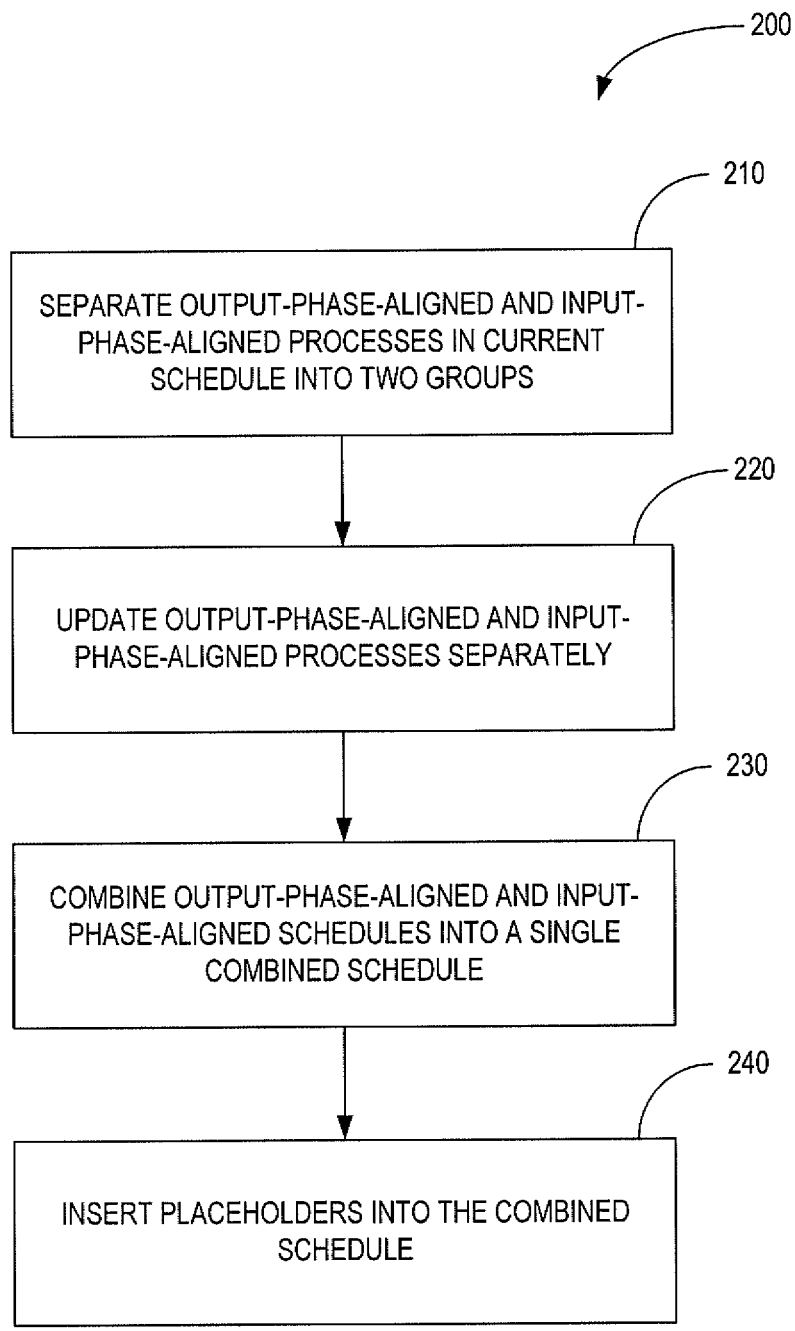
FIG. 5 illustrates an exemplary joint scheduling method according to another embodiment.

FIG. 5 illustrates an exemplary procedure 200 according to one embodiment applying both input-phase-aligned and output-phase-aligned scheduling. The procedure begins by separating input-phase-aligned and output-phase-aligned process into separate groups (block 210). Some output-phase aligned processes may be subject to a TA requests. Similarly, some input-phase-aligned processes may be subject to DJBFT requests. Next, the joint scheduler 40 applies the minimax algorithm, or other optimization algorithm, to separately determine a schedule for the output-phase-aligned and input-phase-aligned processes (block 220). The TA requests and DJBFT requests are considered during the scheduling. The joint scheduler 40 then combines the output-phase-aligned and input-phase-aligned schedules (block 230). Contention is resolved during the combining process. Contention occurs when:

The processing period of a process in the output-phase-aligned schedule and the processing period of a process in the input-phase-aligned schedule overlap;

A process in the output-phase-aligned schedule is moved, namely advanced, into the processing period of another scheduled process earlier in the scheduling cycle;

A process in the input-phase-aligned schedule is moved, namely delayed, into the processing period of another scheduled process later in the scheduling cycle.

Contention is resolved by advancing output-phase-aligned processes to avoid late delivery and/or delaying input-phase-aligned processes to avoid early activation. The amount of adjustment is determined to minimize the maximum deviation from the respective targets.

Output-phase-aligned processes can be queued for execution early, but cannot be delivered late. Because output-phase-aligned processes cannot deliver output after the delivery target and the processes can be delayed by unscheduled processes, output-phase-aligned process activation time is artificially advanced by "ADVANCE MARGIN" to compensate for the potential delay. Input-phase-aligned processes can be posted late but cannot be early. Because input-phase-aligned processes cannot be started before the start target, i.e., expected arrival time, and the processes can be advanced when other scheduled processes ahead in the same cycle are removed, input-phase-aligned process activation time is artificially delayed by "DELAY MARGIN" to compensate for the potential advance.

After the schedules are combined, the joint scheduler 40 may optionally insert placeholders in anticipation of new channels being added (block 240).

The joint scheduling techniques for scheduling two or more tasks as described herein can help reduce or minimize queuing delay where a single processor is responsible for processing data for multiple processing tasks. Embodiments of the invention may be incorporated into media gateways supporting mobile call contexts. The joint scheduling approach can be dynamically adapted as processes are added or deleted. The joint scheduling approach also lends itself to versatile and flexible designs whose implementation can be tailored to meet various implementation constraints and design objectives. It has a small footprint that makes it particularly suitable for Digital Signal Processor (DSP) implementation for real time high-capacity applications.

What is claimed is:

1. A method implemented by a data processing node in a communication network of jointly scheduling multiple processes having known processing times on a shared processor, said method comprising for each one of a plurality of periodic processes associated with two or more different data streams and having a common period, determining an expected arrival time for input data or a required delivery time for output data;

jointly determining process activation times for sequential processing of said periodic processes based on the processing time and the arrival time or delivery time for each process, so as to minimize a queuing delay for the processes according to a predetermined joint optimization criterion; and scheduling said periodic processes on said shared processor according to the jointly determined activation times so that each process, once started, is scheduled to be completed before the next process is started.

2. The method of claim 1 wherein jointly determining process activation times for said periodic processes comprises scheduling said periodic processes to minimize a worst-case queuing delay.

3. The method of claim 1 wherein jointly determining process activation times for said periodic processes comprises scheduling said periodic processes to minimize a mean queuing delay.

4. The method of claim 1 wherein jointly determining process activation times for said periodic processes comprises determining input-phase-aligned activation times for said periodic processes.

5. The method of claim 4 wherein determining input-phase-aligned activation times for said periodic processes comprises determining expected arrival times for said input data and determining said input-phase-aligned activation times from said expected arrival times and said processing times.

6. The method of claim 1 wherein jointly determining process activation times for said periodic processes comprises determining output-phase-aligned activation times for said processes.

7. The method of claim 6 wherein determining output-phase-aligned activation times for said periodic processes comprises determining required delivery times for said output data and determining said output-phase-aligned activation times from said required delivery times and said processing times.

8. The method of claim 1 wherein jointly determining process activation times for said processes comprises determining input-phase-aligned activation times for a first subset of said periodic processes and output-phase-aligned activation times for a second subset of said periodic processes, and merging the input-phase-aligned activation times and output-phase-aligned activation times into a single schedule.

9. The method of claim 8 wherein merging the activation times for the first and second subsets of periodic processes into a single schedule includes resolving contention between the input-phase-aligned and output-phase-aligned activation times.

10. The method of claim 9 wherein resolving contention between the input-phase-aligned and output-phase-aligned activation times comprises advancing one or more output-phase-aligned activation times or delaying one or more input-phase-aligned activation times.

11. The method of claim 1 further comprising assigning the periodic processes to respective processing queues according to priority.

12. The method of claim 11 wherein pending periodic processes assigned the low priority queue are executed in the order of posting when there is no higher priority process pending, and wherein pending periodic processes in the high priority queue are executed in the order of posting.

13. The method of claim 10 wherein jointly determining process activation times for said periodic processes comprises jointly determining process activation times to minimize a worst-case queuing delay for periodic processes assigned to a high priority queue.

14. The method of claim 10 wherein jointly determining process activation times for said periodic processes comprises jointly determining process activation times to minimize a mean queuing delay for periodic processes assigned to a high priority queue.

15. A processing circuit comprising:
a shared processor to perform multiple periodic processes associated with two or more channels and having a common period, each periodic process having a known processing time; and
a scheduler for jointly scheduling the processing of the periodic processes on said shared processor, said scheduler configured to:
for each one of said periodic processes, determining at least one of an expected arrival time for input data and a required delivery time for output data;
jointly determining process activation times for sequential processing of said periodic processes based on said processing time and the arrival time or delivery time for each periodic process so as to minimize a queuing delay for the periodic processes according to a predetermined joint optimization criterion; and
scheduling said periodic processes on said shared processor according to the jointly determined activation times so that each process, once started, is scheduled to be completed before the next process is started.

16. The processing circuit of claim 15 wherein said scheduler is configured to minimize a worst-case queuing delay.

17. The processing circuit of claim 15 wherein said scheduler is configured to minimize a mean queuing delay.

18. The processing circuit of claim 15 wherein said scheduler is configured to determine input-phase-aligned activation times for said periodic processes.

19. The processing circuit of claim 18 wherein said scheduler is configured to determine the expected arrival times for said input data and to determine said input-phase-aligned activation times from said expected arrival times and said processing times.

20. The processing circuit of claim 15 wherein said scheduler is configured to determine output-phase-aligned activation times for said periodic processes.

21. The processing circuit of claim 20 wherein said scheduler is configured to determine required delivery times for said output data and to determine said output-phase-aligned activation times from said required delivery times and said processing times.

22. The processing circuit of claim 15 wherein said scheduler is configured to determine input-phase-aligned activation times for a first subset of said periodic processes, output-phase-aligned activation times for a second subset of said periodic processes, and merge the input-phase-aligned activation times and output-phase-aligned activation times into a single schedule.

23. The processing circuit of claim 22 wherein the scheduler is configured to resolve contention between the input-phase-aligned and output-phase-aligned activation times when merging the input-phase-aligned activation times and output-phase-aligned activation times into a single schedule.

24. The processing circuit of claim 23 wherein the scheduler is configured to advance one or more output-phase-aligned activation times or delay one or more input-phase-aligned activation times to resolve contentions.

25. The processing circuit of claim 15 wherein the scheduler is further configured to assign the periodic processes to respective processing queues according to priority.

26. The processing circuit of claim 25 wherein the shared processor executes periodic processes assigned the low priority queue in the order of posting when there is no higher priority process pending, and executes pending periodic processes in the high priority queue in the order of posting.

27. The processing circuit of claim 26 wherein the scheduler is further configured to determining process activation times to minimize a worst-case queuing delay for periodic processes assigned to a high priority queue.

28. The processing circuit of claim 26 wherein the scheduler is further configured to determining process activation times to minimize a mean queuing delay for periodic processes assigned to a high priority queue.

* * * * *